No. 680,122. Patented Aug. 6, 1901.
E. T. CAMP.
APPARATUS FOR VAPORIZING MEDICINAL AGENTS.
(Application filed Jan. 24, 1901.)
(No Model.)
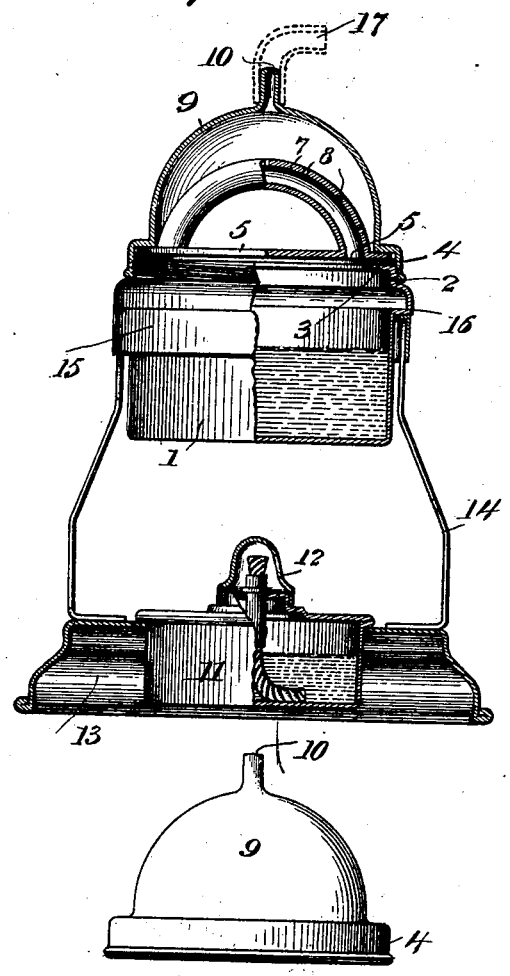
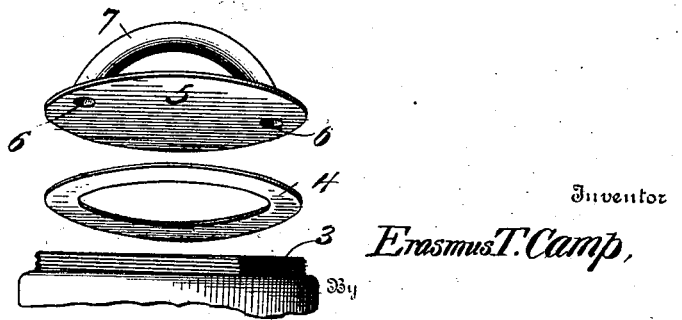
Witnesses
Fenton S. Belt,
Geo. T. Kingsbury.
Inventor
Erasmus T. Camp,
By Beall & Finnick his Attorneys.
THE NORRIS PETERS CO., PHOTO-LITHO., WASHINGTON, D. C.

UNITED STATES PATENT OFFICE.

ERASMUS T. CAMP, OF GADSDEN, ALABAMA.

APPARATUS FOR VAPORIZING MEDICINAL AGENTS.

SPECIFICATION forming part of Letters Patent No. 680,122, dated August 6, 1901.

Application filed January 24, 1901. Serial No. 44,608. (No model.)

*To all whom it may concern:*

Be it known that I, ERASMUS T. CAMP, a citizen of the United States, residing at Gadsden, in the county of Etowah and State of Alabama, have invented new and useful Improvements in Apparatus for Vaporizing Medicinal Agents, of which the following is a specification.

My invention relates to an apparatus for vaporizing or generating any medicinal agent, either for the treatment of diseases of the respiratory tract by inhalation or for disinfecting or deodorizing purposes for the prevention and spread of contagious and infectious diseases, and is especially adapted for generating formaldehyde gas from a solution of formaldehyde in combination with water-vapor.

The object of my invention is the production of a small portable generator which will successfully accomplish these purposes.

The invention consists of certain novel constructions, combinations, and arrangement of parts, as will be hereinafter fully described and specifically claimed.

In the accompanying drawings, Figure 1 is a side elevation, partly in section, of my improved apparatus; and Fig. 2 is a perspective view of the most important elements or parts of my apparatus in a separated condition.

1 in the accompanying drawings represents a generating-chamber, which in using the apparatus is supplied with a suitable quantity of the medicinal agent to be generated or vaporized, which in this instance we will say is formaldehyde, from which it is desired to generate formaldehyde gas in combination with water-vapor. This chamber or receptacle 1 is preferably formed with a screw-threaded portion 2 and with a flat inwardly-extending flange portion 3, the latter forming a seat for the reception of a gasket 4, of rubber or other suitable material. On top of the generating chamber or receptacle 1 and resting on the gasket 4, so as to completely cover the entrance to said generating-chamber, is placed a diaphragm 5, which is provided with two spaced apertures 6, which are connected by an arched or curved tube 7, which latter is provided in its upper surface with small apertures 8, which extend practically the entire length of the tube, the under side of the tube being imperforate. Fitted over the diaphragm and tube and secured to the upper edge of the generating chamber or receptacle 1 is a removable dome or hood 9, which latter is substantially semispherical in shape except at its extreme upper end, where it is reduced in size and formed into a nipple, which is provided with a fine aperture 10 for the escape of the fumes or gases arising from the generated products.

The important feature of my invention is the construction and arrangement of the curved or arched tube 7, extending upwardly from the diaphragm 5 and connecting the spaced aperture 6 and providing perforations 8 in the upper portion or surface of the said tube and having the under side or lower portion of the said tube imperforate.

I have used an apparatus constructed in accordance with the description just given and have found the same to operate most successfully in generating formaldehyde gas from a solution of formaldehyde in combination with water-vapor.

For generating the gas I employ a small lamp 11 of any suitable construction, adapted to burn any suitable inflammable material, such as alcohol, and where alcohol is employed I provide the lamp with a suitable cap 12 of ordinary construction to prevent the escape of the alcohol when the lamp is not lighted. The lamp is supported in a suitable base 13 directly beneath the center of the under side of the generating-chamber 1, which base is formed with a suitable supporting-framework comprising vertical standards 14 and a ring 15, connecting the upper ends of the standards. The ring 15 is made of a size to receive the generating chamber or receptacle 1 within the same and to permit the flange or extension 16 on the outer surface of the said generating-chamber to rest on the upper edge of said ring, so as to support said chamber and the superstructure above the same.

The entire device is preferably constructed of aluminium to render the same light and ornamental in appearance and so that the same will not rust, corrode, or tarnish.

This generator is absolutely safe, explosion being impossible, for the reason that the escape of steam or gas is taking place as fast as it is generated.

The elbow-shaped tube 17 on top of the apparatus is for convenience in attaching a piece of rubber tubing for conducting the fumes to any desired place. In many instances it would not be necessary to employ this device.

Having now described my invention, what I claim as new, and desire to secure by Letters Patent, is—

1. An apparatus for vaporizing a medicinal agent comprising in its construction a suitable generating-chamber, a diaphragm arranged on top of said chamber and provided with apertures or openings which are connected by an upwardly-extending curved or arched tube, said tube being provided in its upper surface or portion with fine apertures or perforations for the escape of generated gases, substantially as described.

2. An apparatus for vaporizing a medicinal agent comprising in its construction a suitable generating-chamber, a diaphragm arranged on top of said chamber and provided with apertures or openings which are connected by an upwardly-extending curved or arched tube which is in communication with the generating-chamber, said tube being provided in its upper surface with fine perforations, the under portion of said tube being imperforated, and a hood or dome arranged over said diaphragm and tube and provided with an aperture for the escape of fumes or gases, substantially as described.

3. An apparatus for vaporizing a medicinal agent, comprising in its construction a suitable generating-chamber provided with an opening for the introduction of the liquid to be vaporized, a diaphragm arranged on top of said chamber and covering the introduction-aperture, a gasket arranged between the diaphragm and the top of the generating-chamber to form a tight closure, the diaphragm being provided with openings which are connected by an upwardly-extending curved or arched tube which is in communication with the generating-chamber, said tube being provided in its upper surface with fine perforations, the under portion of said tube being imperforated, and a hood or dome arranged over said diaphragm and tube, and removably attached to the generator by screw-threads, said dome or hood being provided with an aperture for the escape of fumes or gases, substantially as described.

In testimony whereof I affix my signature in presence of two witnesses.

ERASMUS T. CAMP.

Witnesses:
J. E. BLACKWOOD,
PAUL CARSON.